United States Patent
Malmborg

(10) Patent No.: US 11,448,233 B2
(45) Date of Patent: Sep. 20, 2022

(54) FOLLOWING BLADE IMPACT LOAD SUPPORT

(71) Applicant: United Technologies Corporation, Farmington, CT (US)

(72) Inventor: Eric W. Malmborg, Amston, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 307 days.

(21) Appl. No.: 15/602,754

(22) Filed: May 23, 2017

(65) Prior Publication Data

US 2018/0340548 A1 Nov. 29, 2018

(51) Int. Cl.
*F01D 5/18* (2006.01)
*F04D 29/38* (2006.01)
*F01D 21/04* (2006.01)
*F01D 5/14* (2006.01)
*F02K 3/06* (2006.01)
*F04D 29/32* (2006.01)
*F01D 5/28* (2006.01)

(52) U.S. Cl.
CPC ........... *F04D 29/388* (2013.01); *F01D 5/147* (2013.01); *F01D 21/04* (2013.01); *F02K 3/06* (2013.01); *F01D 5/282* (2013.01); *F04D 29/324* (2013.01); *F05D 2220/36* (2013.01); *F05D 2230/236* (2013.01); *F05D 2240/305* (2013.01)

(58) Field of Classification Search
CPC .......... F01D 5/147; F01D 5/282; F01D 21/04; F04D 29/324; F04D 29/388; F05D 2240/303; Y02T 50/672; Y02T 50/673; F02K 3/06

See application file for complete search history.

(56) References Cited

U.S. PATENT DOCUMENTS

| 5,634,771 | A | 6/1997 | Howard et al. |
| 5,947,688 | A | 9/1999 | Schilling et al. |
| 6,033,186 | A | 3/2000 | Schilling et al. |
| 6,039,542 | A | 3/2000 | Schilling et al. |
| 6,431,837 | B1* | 8/2002 | Velicki .................... F01D 5/282 416/223 R |

(Continued)

FOREIGN PATENT DOCUMENTS

| EP | 2243929 A2 | 10/2010 |
| EP | 2540974 A2 | 1/2013 |

(Continued)

OTHER PUBLICATIONS

European Search Report from the European Patent Office for EP Application No. 18173428.6 dated Aug. 21, 2018, 9 pages.

*Primary Examiner* — Gonzalo Laguarda
(74) *Attorney, Agent, or Firm* — Cantor Colburn LLP

(57) ABSTRACT

A fan blade assembly for a gas turbine engine includes a blade extending from a blade root to a blade tip, and from a blade leading edge to a blade trailing edge. The blade includes a plurality of ribs defining a plurality of blade cavities. A pressure surface cover is affixed to the blade and at least partially defines a pressure surface of the fan blade. At least one rib of the plurality of ribs extends along a predicted impact path of a foreign object at the fan blade assembly, thereby supporting impact loads on the pressure surface cover.

11 Claims, 4 Drawing Sheets

(56) References Cited

U.S. PATENT DOCUMENTS

| | | | |
|---|---|---|---|
| 7,794,197 B2 * | 9/2010 | Thompson | F01D 5/147 415/9 |
| 8,083,489 B2 * | 12/2011 | Viens | F01D 5/147 416/229 A |
| 8,821,124 B2 | 9/2014 | Viens et al. | |
| 8,858,182 B2 * | 10/2014 | Schwarz | F01D 5/28 416/224 |
| 9,694,438 B2 * | 7/2017 | Andrews | B23K 20/02 |
| 9,995,152 B2 * | 6/2018 | McComb | F01D 5/147 |

FOREIGN PATENT DOCUMENTS

| | | | |
|---|---|---|---|
| EP | 2862643 A1 | 4/2015 | |
| WO | 2014149098 A2 | 9/2014 | |
| WO | 2015047698 A1 | 4/2015 | |

* cited by examiner

FOLLOWING BLADE IMPACT LOAD SUPPORT

BACKGROUND

Exemplary embodiments pertain to the art of gas turbine engines, and more particularly to fan blade of gas turbine engines.

Gas turbine engines typically include a fan, having a plurality of fan blades extending outwardly from a fan hub. As fans become larger, their weight becomes detrimental to engine performance. Thus, hollow or partially hollow fan blades are often utilized to reduce weight of the fan, relative to a solid fan blade.

During some operational events of the gas turbine engine, a fan blade or a portion of a fan blade releases from the fan hub due to impact from a foreign object or from some other event. In such a "blade loss event", an adjacent blade or "following blade" to the released blade may be impacted by the released blade. Such an impact can cause the flowing blade to crack and release additional material. Additional material released contributes to imbalance experienced by the engine and the aircraft. Minimizing such imbalance is necessary to maintain the structural integrity of both the engine and the aircraft. Hollow fan blade configurations typically offer less structural impact support during such events than do solid fan blade configurations.

BRIEF DESCRIPTION

In one embodiment, a fan blade assembly for a gas turbine engine includes a blade extending from a blade root to a blade tip, and from a blade leading edge to a blade trailing edge. The blade includes a plurality of ribs defining a plurality of blade cavities. A pressure surface cover is affixed to the blade and at least partially defines a pressure surface of the fan blade. At least one rib of the plurality of ribs extends along a predicted impact path of a foreign object at the fan blade assembly, thereby supporting impact loads on the pressure surface cover.

Additionally or alternatively, in this or other embodiments the blade includes a region of solidity at the blade leading edge.

Additionally or alternatively, in this or other embodiments the blade includes a puck located at the blade leading edge along the predicted impact path, defining an increased region of solidity at the blade leading edge in a chordwise direction.

Additionally or alternatively, in this or other embodiments the puck has a tapered thickness, reducing in thickness with increasing distance from the blade leading edge.

Additionally or alternatively, in this or other embodiments the plurality of ribs includes a plurality of spanwise ribs extending in a spanwise direction, and a plurality of chordwise ribs extending in a chordwise direction.

Additionally or alternatively, in this or other embodiments the at least one rib extends nonparallel to neither the plurality of spanwise ribs nor the plurality of chordwise ribs.

Additionally or alternatively, in this or other embodiments the pressure surface cover is affixed to the blade via a diffusion bonding process.

In another embodiment, a fan assembly for a gas turbine engine includes a fan hub and a plurality of fan blade assemblies secured to the fan hub. A fan blade assembly of the plurality of fan blade assemblies includes a blade extending from a blade root to a blade tip, and from a blade leading edge to a blade trailing edge. The blade including a plurality of ribs defining a plurality of blade cavities. A pressure surface cover is affixed to the blade and at least partially defines a pressure surface of the fan blade. At least one rib of the plurality of ribs extends along a predicted impact path of a foreign object at the fan blade assembly, thereby supporting impact loads on the pressure surface cover.

Additionally or alternatively, in this or other embodiments the blade includes a region of solidity at the blade leading edge.

Additionally or alternatively, in this or other embodiments the blade includes a puck located at the blade leading edge along the predicted impact path, defining an increased region of solidity at the blade leading edge in a chordwise direction.

Additionally or alternatively, in this or other embodiments the puck has a tapered thickness, reducing in thickness with increasing distance from the blade leading edge.

Additionally or alternatively, in this or other embodiments the plurality of ribs includes a plurality of spanwise ribs extending in a spanwise direction, and a plurality of chordwise ribs extending in a chordwise direction.

Additionally or alternatively, in this or other embodiments the at least one rib extends nonparallel to neither the plurality of spanwise ribs nor the plurality of chordwise ribs.

Additionally or alternatively, in this or other embodiments the foreign object is an adjacent fan blade of the plurality of fan blades.

In yet another embodiment, a gas turbine engine includes a turbine section and a fan assembly operably connected to the turbine section including a fan hub and a plurality of fan blade assemblies secured to the fan hub. A fan blade assembly of the plurality of fan blade assemblies includes a blade extending from a blade root to a blade tip, and from a blade leading edge to a blade trailing edge. The blade includes a plurality of ribs defining a plurality of blade cavities. A pressure surface cover is affixed to the blade and at least partially defines a pressure surface of the fan blade. At least one rib of the plurality of ribs extends along a predicted impact path of a foreign object at the fan blade assembly, thereby supporting impact loads on the pressure surface cover.

Additionally or alternatively, in this or other embodiments the blade includes a region of solidity at the blade leading edge.

Additionally or alternatively, in this or other embodiments the blade includes a puck located at the blade leading edge along the predicted impact path, defining an increased region of solidity at the blade leading edge in a chordwise direction.

Additionally or alternatively, in this or other embodiments the plurality of ribs includes a plurality of spanwise ribs extending in a spanwise direction and a plurality of chordwise ribs extending in a chordwise direction.

Additionally or alternatively, in this or other embodiments the at least on rib extends nonparallel to neither the plurality of spanwise ribs nor the plurality of chordwise ribs.

Additionally or alternatively, in this or other embodiments the foreign object is an adjacent fan blade of the plurality of fan blades.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
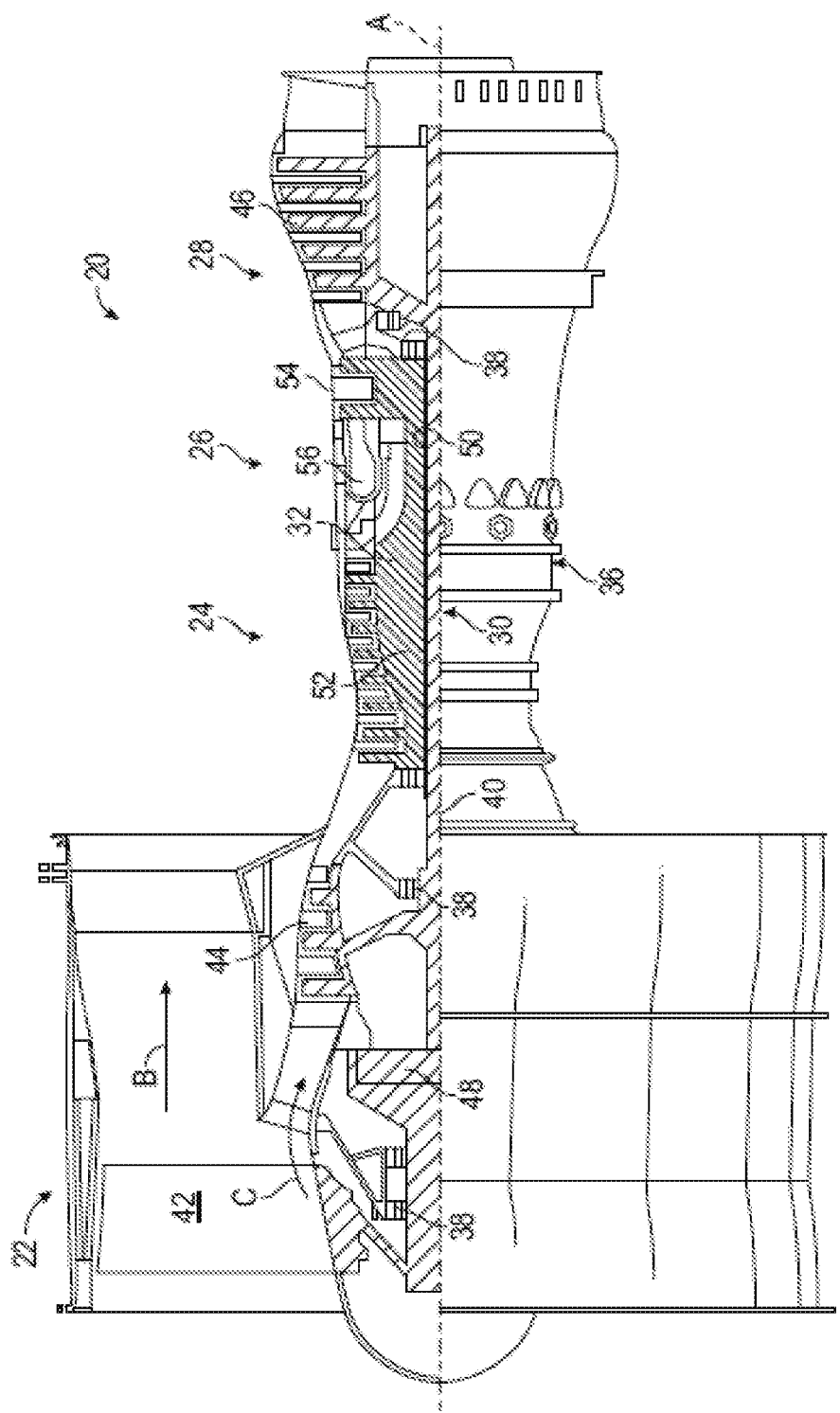
FIG. 1 is cross-sectional view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(T ram °R)/(518.7°R)]^{0.5}$. The "Low corrected fan tip speed" as disclosed herein according to one non-limiting embodiment is less than about 1150 ft/second (350.5 m/sec).

Figure 2:
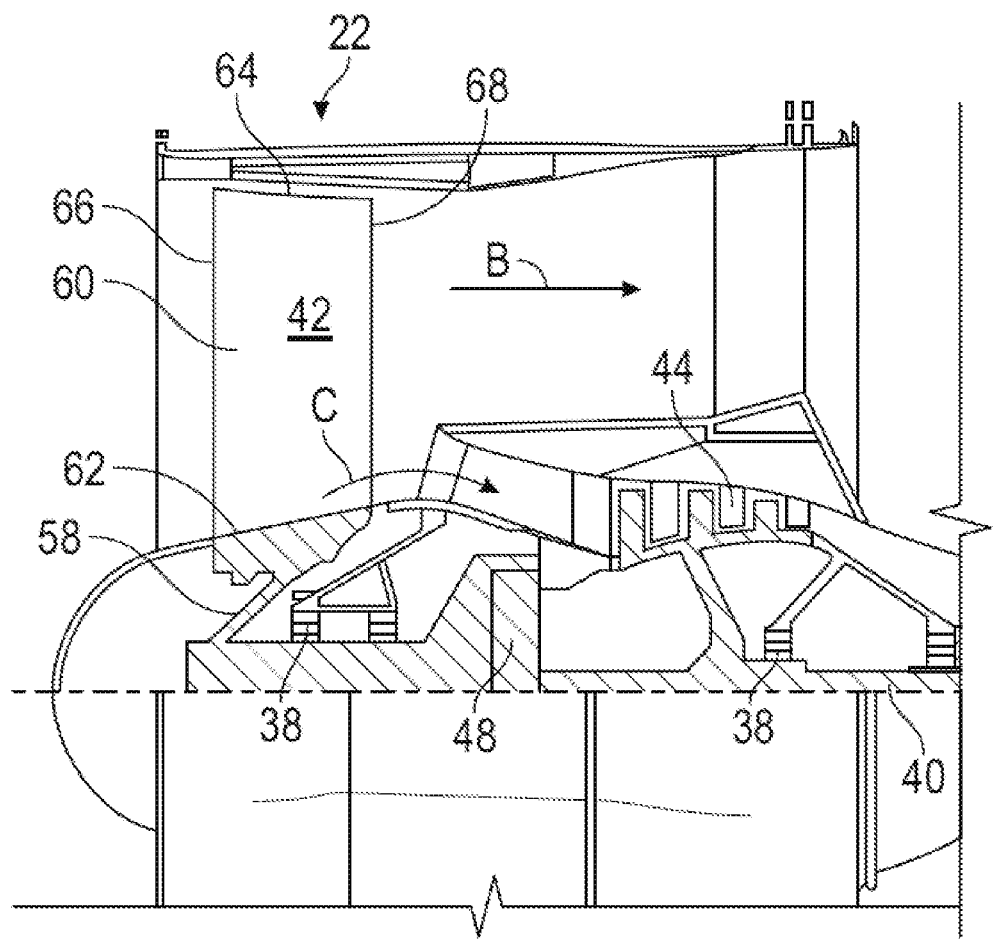
FIG. 2 is a cross-sectional view of an embodiment of a fan section of a gas turbine engine.

Referring now to FIG. 2, an embodiment of a fan 42 is illustrated. The fan 42 includes a fan hub 58 located at the engine central longitudinal axis A and rotatable about the engine central longitudinal axis A. A plurality of fan blades 60 are secured to and extend outwardly from the fan hub 58. In some embodiments, the fan 42 includes 20 fan blades 60, while in other embodiments other quantities of fan blades 60 are utilized.

In a blade loss event, a portion of a fan blade 60 or an entire fan blade 60 is released from the fan 42. Due to rotation of the fan 42 about the central longitudinal axis A, the released fan blade 60 may impact an adjacent or following fan blade 60 of the fan 42. Any additional material released by the following fan blade 60 contributes to imbalance experienced by the engine and the aircraft. To prevent the release of material from the flowing fan blade 60, the fan blade 60 is configured as in the following description.

Figure 3:
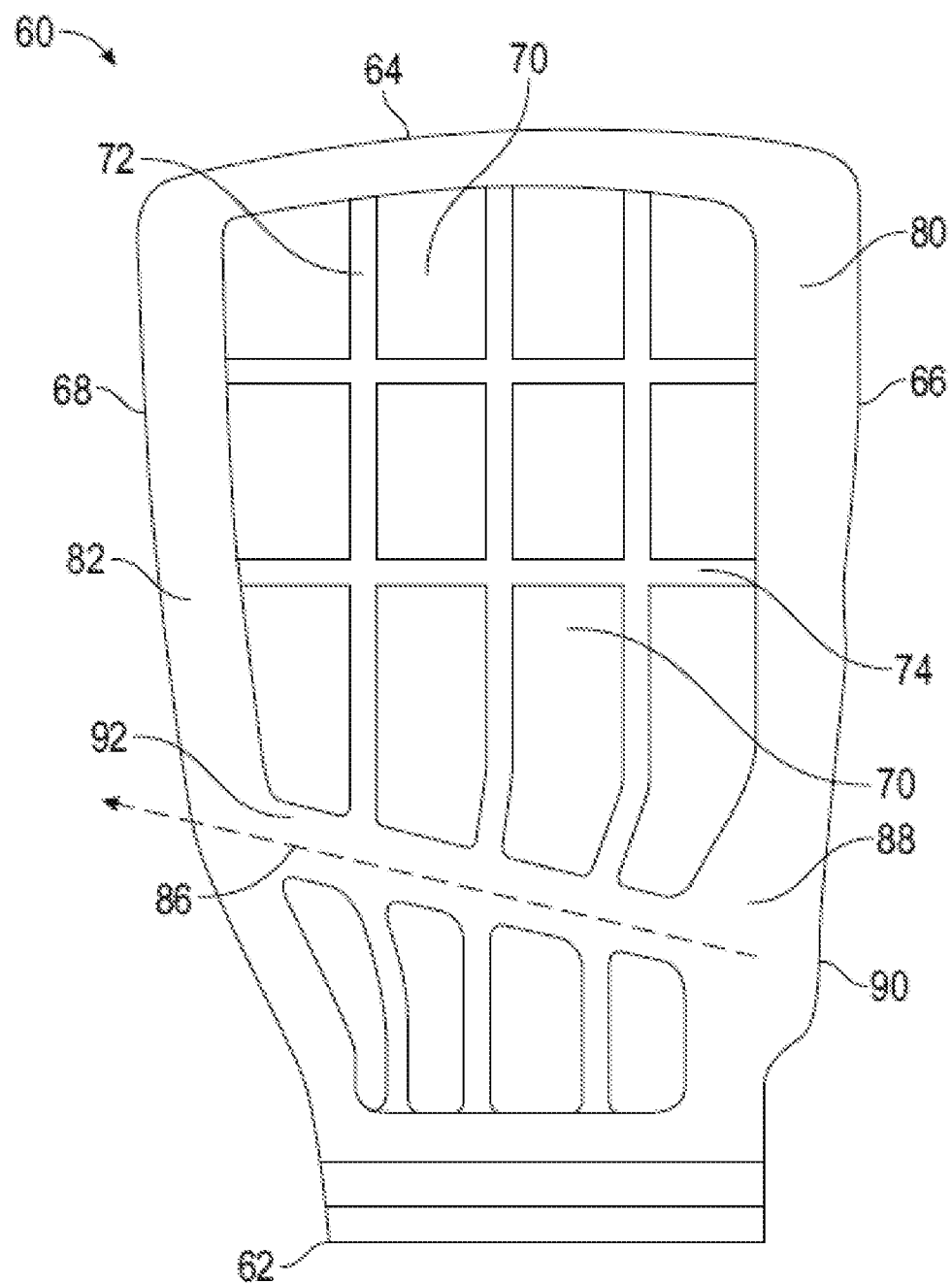
FIG. 3 is a cross-sectional view of an embodiment of a fan blade.

Referring now to FIG. 3, a cross-sectional view of a fan blade 60 is shown. The fan blade 60 includes a blade root 62, which is securable to fan hub 58, and a blade tip 64. Together, the blade root 62 and the blade tip define a blade span of the fan blade 60. Further, the fan blade 60 includes a blade leading edge 66 and a blade trailing edge 68, that together define a chordwise extent of the fan blade 60.

Figure 4:
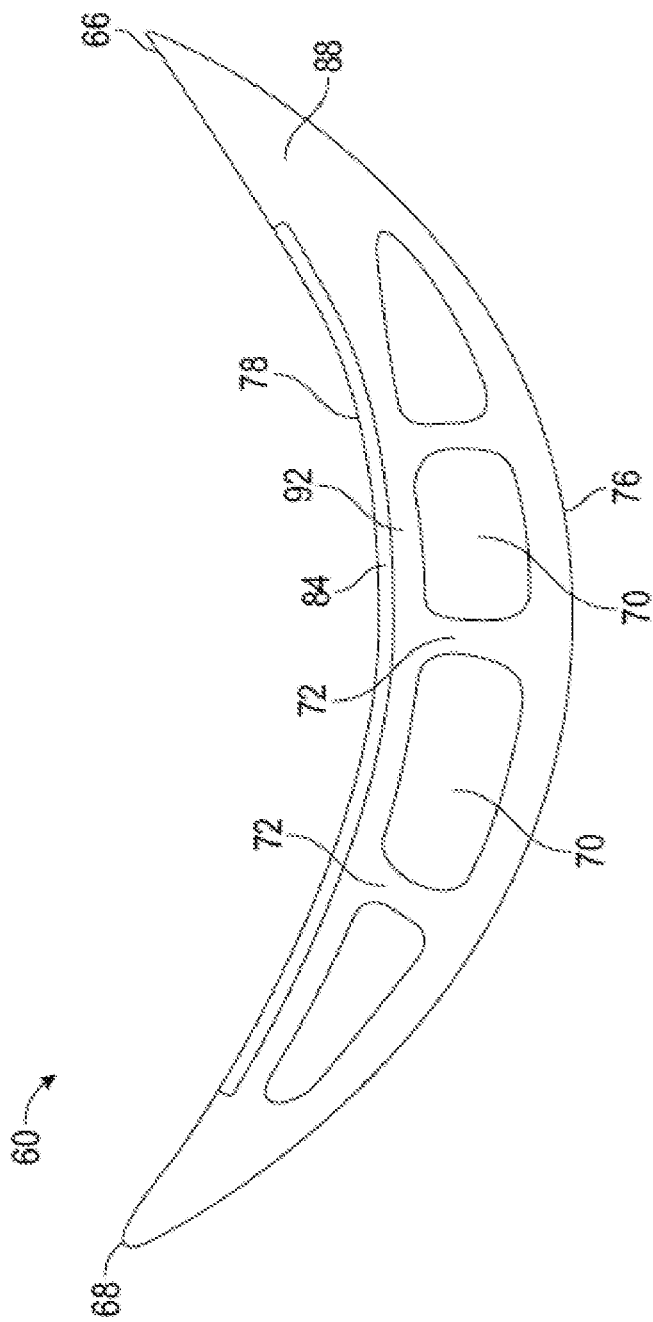
FIG. 4 is another cross-sectional view of an embodiment of a fan blade.

As shown in FIG. 3 and FIG. 4, the fan blade 60 is hollow, having a plurality of blade cavities 70 formed therein. The blade cavities 70 are defined between spanwise ribs 72 and chordwise ribs 74 of the fan blade 60, and also between a suction surface 76 and a pressure surface 78 of the fan blade 60. In some embodiments, such as shown in FIG. 3, the fan blade 60 has a region of leading edge solidity 80 extending along the blade leading edge 66 from the blade root 62 to the blade tip 64, and likewise a region of trailing edge solidity 82 extending along the blade trailing edge 68 from the blade root 62 to the blade tip 64.

As shown best in FIG. 4, the fan blade 60 includes a pressure surface cover 84 secured to the fan blade 60 via, for example, diffusion bonding. The pressure surface cover 84 at least partially defines the pressure surface 78 of the fan blade 60 and serves as a "cover" for the blade cavities 70, enclosing the blade cavities 70. The pressure surface cover 84 may be formed from a material identical to that of the remainder of fan blade 60, or in some embodiments may be formed from a different material.

A released fan blade has a predicted release trajectory 86, across the following fan blade 60. The predicted release trajectory 86 may be located anywhere along the fan blade 60. The fan blade 60 includes a puck 88 at a predicted initial impact site 90 of the released fan blade along the blade leading edge 66. The puck 88 is a region of increased solidity at the initial impact site 90, relative to the leading edge solidity 80. Further, as shown in FIG. 4, the puck 88 may have a tapered thickness, which decreases with distance from the blade leading edge 66. The puck 88 hardens the initial impact site 90, such that the initial impact site 90 is better able to absorb the impact loads.

Further, the fan blade 60 includes a rib 92 extending along the predicted release trajectory 86, in some embodiments parallel to the projected release trajectory 86, and/or centered on the projected release trajectory 86. While one such rib 92 is shown in the embodiment of FIG. 3, it is to be appreciated that in some embodiments, two or more such ribs 92 may be utilized. Referring to FIG. 4, the rib 92 is located and configured to support the pressure surface cover 84 of the fan blade 60 along the predicted release trajectory 86. The rib 92 located along the predicted release trajectory 86 provides additional resistance to the pressure surface cover 84 of impact loads of the released fan blade during a blade release event. In some embodiments, the rib 92 is angularly offset from the spanwise ribs 72 and chordwise ribs 74.

The fan blades 60 disclosed herein reduce potential imbalance during a blade loss event by preventing loss of the following fan blade 60 due to the strengthening thereof along the predicted release trajectory 86. Further, locally strengthening the fan blade 60 such as in the present embodiments allows for a reduction in thickness of the pressure surface cover 84, or for the use of an alternative material for the pressure surface cover 84, thus resulting in a lower weight fan blade 60 configuration.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fan blade assembly for a gas turbine engine, comprising:
    a blade portion extending from a blade root to a blade tip, and from a blade leading edge to a blade trailing edge, the blade portion including a plurality of ribs defining a plurality of blade cavities, the blade portion defining the blade leading edge, the blade trailing edge and a suction surface of the blade; and
    a pressure surface cover disposed in a recess in the blade portion and affixed to the blade portion and at least partially defining a pressure surface of the fan blade;
    wherein at least one rib of the plurality of ribs extends along a predicted release trajectory of an adjacent blade, thereby supporting impact loads on the pressure surface cover;
    wherein the blade portion includes a region of solidity absent blade cavities at the blade leading edge;
    wherein the blade includes a puck defined in an interior of the blade portion beneath the pressure surface cover and disposed at the blade leading edge along the predicted release trajectory, the puck defining an increased region of solidity extending from the region of solidity in a chordwise direction, the puck having a decreasing spanwise width with increasing chordwise distance from the blade leading edge, along a side of the blade closest to the pressure surface cover;
    wherein the puck has a tapered thickness, reducing in thickness with increasing distance from the blade leading edge; and
    wherein the puck has a tapered spanwise width, reducing in width with increasing distance from the blade leading edge;
    wherein a maximum chordwise length of the puck is located at the at least one rib.

2. The fan blade assembly of claim 1, wherein the plurality of ribs includes:
    a plurality of spanwise ribs extending in a spanwise direction; and
    a plurality of chordwise ribs extending in a chordwise direction.

3. The fan blade assembly of claim 2, wherein the at least one rib extends nonparallel to both the plurality of spanwise ribs and the plurality of chordwise ribs.

4. The fan blade assembly of claim 1, wherein the pressure surface cover is affixed to the blade via a diffusion bonding process.

5. The fan blade assembly of claim 1, wherein the at least one rib extends from the puck.

6. A fan assembly for a gas turbine engine, comprising:
a fan hub; and
a plurality of fan blade assemblies secured to the fan hub, a fan blade assembly of the plurality of fan blade assemblies including:
 a blade portion extending from a blade root to a blade tip, and from a blade leading edge to a blade trailing edge, the blade portion including a plurality of ribs defining a plurality of blade cavities, the blade portion defining the blade leading edge, the blade trailing edge and a suction surface of the blade; and
 a pressure surface cover disposed in a recess in the blade portion and affixed to the blade portion and at least partially defining a pressure surface of the fan blade;
wherein at least one rib of the plurality of ribs extends along a predicted release trajectory of an adjacent blade, thereby supporting impact loads on the pressure surface cover;
wherein the blade portion includes a region of solidity absent blade cavities at the blade leading edge;
wherein the blade includes a puck defined in an interior of the blade portion beneath the pressure surface cover and disposed at the blade leading edge along the predicted release trajectory, the puck defining an increased region of solidity extending from the region of solidity in a chordwise direction, the puck having a decreasing spanwise width with increasing chordwise distance from the blade leading edge, along a side of the blade closest to the pressure surface cover;
wherein the puck has a tapered thickness, reducing in thickness with increasing distance from the blade leading edge; and
wherein the puck has a tapered spanwise width, reducing in width with increasing distance from the blade leading edge;
wherein a maximum chordwise length of the puck is located at the at least one rib.

7. The fan assembly of claim 6, wherein the plurality of ribs includes:
a plurality of spanwise ribs extending in a spanwise direction; and
a plurality of chordwise ribs extending in a chordwise direction.

8. The fan assembly of claim 7, wherein the at least one rib extends nonparallel to both the plurality of spanwise ribs and the plurality of chordwise ribs.

9. A gas turbine engine, comprising:
a turbine section; and
a fan assembly operably connected to the turbine section, including:
 a fan hub; and
 a plurality of fan blade assemblies secured to the fan hub, a fan blade assembly of the plurality of fan blade assemblies including:
  a blade portion extending from a blade root to a blade tip, and from a blade leading edge to a blade trailing edge, the blade portion including a plurality of ribs defining a plurality of blade cavities, the blade portion defining the blade leading edge, the blade trailing edge and a suction surface of the blade; and
  a pressure surface cover disposed in a recess in the blade portion and affixed to the blade portion and at least partially defining a pressure surface of the fan blade;
wherein at least one rib of the plurality of ribs extends along a predicted release trajectory of an adjacent blade, thereby supporting impact loads on the pressure surface cover;
wherein the blade portion includes a region of solidity absent blade cavities at the blade leading edge;
wherein the blade includes a puck defined in an interior of the blade portion beneath the pressure surface cover and disposed at the blade leading edge along the predicted release trajectory, the puck defining an increased region of solidity extending from the region of solidity in a chordwise direction, the puck having a decreasing spanwise width with increasing chordwise distance from the blade leading edge, along a side of the blade closest to the pressure surface cover;
wherein the puck has a tapered thickness, reducing in thickness with increasing distance from the blade leading edge; and
wherein the puck has a tapered spanwise width, reducing in width with increasing distance from the blade leading edge;
wherein a maximum chordwise length of the puck is located at the at least one rib.

10. The gas turbine engine of claim 9, wherein the plurality of ribs includes:
a plurality of spanwise ribs extending in a spanwise direction; and
a plurality of chordwise ribs extending in a chordwise direction.

11. The gas turbine engine of claim 10, wherein the at least on rib extends nonparallel to both the plurality of spanwise ribs and the plurality of chordwise ribs.

* * * * *